(12) United States Patent
Hendrickson et al.

(10) Patent No.: US 7,725,233 B2
(45) Date of Patent: May 25, 2010

(54) CROP ATTRIBUTE MAP INPUT FOR VEHICLE GUIDANCE

(75) Inventors: Larry Lee Hendrickson, Naperville, IL (US); Terence Daniel Pickett, Waukee, IA (US); Stephen Michael Faivre, Kingston, IL (US)

(73) Assignee: Deere & Company, Moline, IL (US)

( * ) Notice: Subject to any disclaimer, the term of this patent is extended or adjusted under 35 U.S.C. 154(b) by 1091 days.

(21) Appl. No.: 11/258,574

(22) Filed: Oct. 25, 2005

(65) Prior Publication Data

US 2007/0089390 A1  Apr. 26, 2007

(51) Int. Cl.
 *G06F 15/00* (2006.01)

(52) U.S. Cl. ............................ 701/50; 701/23; 180/401; 340/990; 340/995.12; 340/995.14; 340/995.19; 340/995.22; 340/995.24; 340/995.27; 56/10.2 D; 56/10.5; 56/10.8; 56/10.2 H

(58) Field of Classification Search .................... 701/50, 701/23; 180/401; 340/990, 995.1, 995.12, 340/995.14, 995.19, 995.22, 995.24, 995.27; 56/10.2 D, 10.5, 10.8, 10.2 H
See application file for complete search history.

(56) References Cited

U.S. PATENT DOCUMENTS

| 5,666,793 | A | | 9/1997 | Bottinger ................. 56/10.2 R |
| 5,878,371 | A | * | 3/1999 | Hale et al. ..................... 702/5 |
| 5,902,343 | A | * | 5/1999 | Hale et al. ................... 701/50 |
| 5,938,709 | A | * | 8/1999 | Hale et al. ................... 701/50 |
| 5,957,304 | A | | 9/1999 | Dawson ..................... 209/552 |
| 6,061,618 | A | * | 5/2000 | Hale et al. .................... 701/50 |
| 6,128,574 | A | | 10/2000 | Diekhans .................... 701/209 |
| 6,178,253 | B1 | | 1/2001 | Hendrickson et al. ........ 382/110 |
| RE37,574 | E | | 3/2002 | Rawlins ......................... 702/2 |
| 6,505,146 | B1 | * | 1/2003 | Blackmer .................. 702/189 |
| 6,529,615 | B2 | | 3/2003 | Hendrickson et al. |
| 6,728,607 | B1 | | 4/2004 | Anderson ................... 701/25 |
| 6,745,128 | B2 | * | 6/2004 | Hanson ......................... 702/2 |
| 2003/0018431 | A1 | * | 1/2003 | Hanson ......................... 702/5 |
| 2003/0125877 | A1 | * | 7/2003 | Hanson ......................... 702/5 |
| 2003/0187560 | A1 | | 10/2003 | Keller et al. |
| 2003/0208319 | A1 | | 11/2003 | Ell et al. |
| 2004/0130714 | A1 | | 7/2004 | Gellerman et al. .......... 356/300 |
| 2005/0088643 | A1 | | 4/2005 | Anderson |

OTHER PUBLICATIONS

"Multispectral"; Merriam-Webster; Jul. 28, 2009; http://www.merriam-webster.com/dictionary/multispectral.*
Taylor, James, Whelan, Brett, Thylen, Lars, Gilbertsson, Mikael, Hassall, James, Monitoring Wheat Protein Content On-Harvester: Australian Experiences, 9 pages.
International Search Report and Written Opinion of the International Searching Authority dated Sep. 14, 2007.

* cited by examiner

*Primary Examiner*—Khoi Tran
*Assistant Examiner*—Nikhil Sriraman

(57) ABSTRACT

A method for dividing a field into zones with similar crop attributes and developing a mission plan for steering the harvester to selectively harvest crops based on one or more of the attributes. The attributes include protein level, starch level, oil level, sugar content, moisture level, digestible nutrient level, or any other crop characteristic of interest. The method can be applied to selectively harvest and/or segregate according to attribute any crop, including grains such as wheat, corn, or beans, fruits such as grapes, and forage crops. Directed crop sampling provides absolute value and variance information for segregated batches of harvested crop.

26 Claims, 4 Drawing Sheets

CROP ATTRIBUTE MAP INPUT FOR VEHICLE GUIDANCE

FIELD OF THE INVENTION

The present invention relates generally to intelligent crop harvesting and, more specifically, to guidance assistance for a crop harvester or similar implement based on one or more crop attributes.

BACKGROUND OF THE INVENTION

Most current methods for harvesting crops involve simple pass to pass steps without opportunity to efficiently separate crop according to crop attributes level to optimize market price potential and profitability. Although on-board crop monitors are becoming available for sampling harvested grain from point grain samples and estimating overall attribute levels of a harvested crop, most provide range or variance information of batches of harvested crop in the storage area without segregation of the crop according to attributes. Also, automatic sampling systems generally lack a good method for deciding areas wherein samples are to be taken.

Various attempts have been made for segregating crop based on attribute levels, including use of field topology such as slope, elevation and contour to divide fields of crop into zones. Dividing soybean fields into areas that correlate to protein levels has been proposed. For example, beans growing on knolls often mature weeks before those in the rest of the field, so farmers will go into the fields and selectively harvest the mature beans. Most crop segregation methods have been based on the visual perception of field and crop conditions by the harvester operator and a subjective view of potential value.

Prior evaluation of the level of attribute desired in a previous harvest is often ineffective for determining attribute zones in a present crop since there are numerous variables that affect crop attributes. Heretofore, there has not been an entirely satisfactory method for locating boundaries of areas of desired attributes and providing information in an effective and user-friendly manner to assist an operator in the harvest and segregation of the crop or to provide input to an automated harvester guidance system for that purpose.

Various methods have been proposed for guiding a vehicle, including selection of a work path based upon geographic factors of the area being traversed to minimize energy usage. Such a method is shown, for example, in U.S. Pat. No. 6,728,607. Other work path planning methods for such functions as optimizing travel routes, minimizing work times, optimizing unloading operations of harvesters and the like, are exemplified in U.S. Pat. No. 6,128,574. However, a reliable and user friendly method for establishing a mission plan to assist in crop segregation by attribute is required.

A method for segregating crops at the point of harvest including the step of operating a diverter on the basis of machine position and a map of harvesting instructions is shown in U.S. Pat. No. 5,957,304. Such diverter methods generally limit the number of segregated batches to the number of storage areas or bins provided at the harvester. Segregating crop by attribute into a number of batches greater than the number of storage areas presents difficulties. Segregating crops into a plurality of batches or loads and providing a convenient and reliable measurement of the mean and variance of the attributes of a batch or load of harvested crop have also been continuing sources of difficulty.

SUMMARY OF THE INVENTION

It is therefore an object of the invention to provide an improved method for segregating harvested crop according to crop attributes. It is a further object to provide such a method which overcomes most or all of the aforementioned problems.

It is another object of the invention to provide an improved method for establishing crop attribute maps and using the maps for segregating harvested crop according to attributes. It is a further object to provide an improved method for establishing absolute values of the mean and variance for a load of crop sufficiently accurate to meet at least most marketing and end user requirements.

In accordance with aspects of the present invention, site specific information related to one or more attributes of the crop is utilized to provide an attribute map of estimated crop attribute level. The harvester is then controlled utilizing the attribute map to segregate harvested crop during harvesting according to the estimated crop attribute level. In one embodiment, a preferred steering path based on the attribute map is generated, and the harvester is steered either manually or automatically according to the preferred steering path. Using such a mission plan approach facilitates segregation of crop into a plurality of batches or loads according to crop attribute. In another embodiment, crop can be directed to one of two or more storage areas associated with the harvester, with the storage area selected dependent on the estimated crop attribute level. By using diverting in combination with a mission plan, the crop can be divided by attribute into a number of batches or loads with the number not limited by the number of storage areas at the harvester.

The site specific information may include such things as elevation, a multi-spectral image of the field, previous or estimated crop yield, and environmental conditions. Zones of similar site specific characteristics may be determined for generating sampling points within generally homogenous areas of the zones. The sampling points are labeled according to GPS location and are utilized to help create estimated crop attributes maps. The attribute maps may then be utilized for mission planning to determine a preferred harvesting path that minimizes attribute variability during harvesting while minimizing harvest time for the desired range of crop attribute variability. An accurate mean and/or variance for the segregated harvested crop is established to meet marketing and end user needs. In one embodiment, a sampler located on the harvester or storage area is used to provide absolute crop attribute values and variability of the attribute within a load of harvested crop.

These and other objects, features and advantages of the present invention will become apparent from the description below in view of the drawings.

DESCRIPTION OF THE PREFERRED EMBODIMENT

Figure 1:
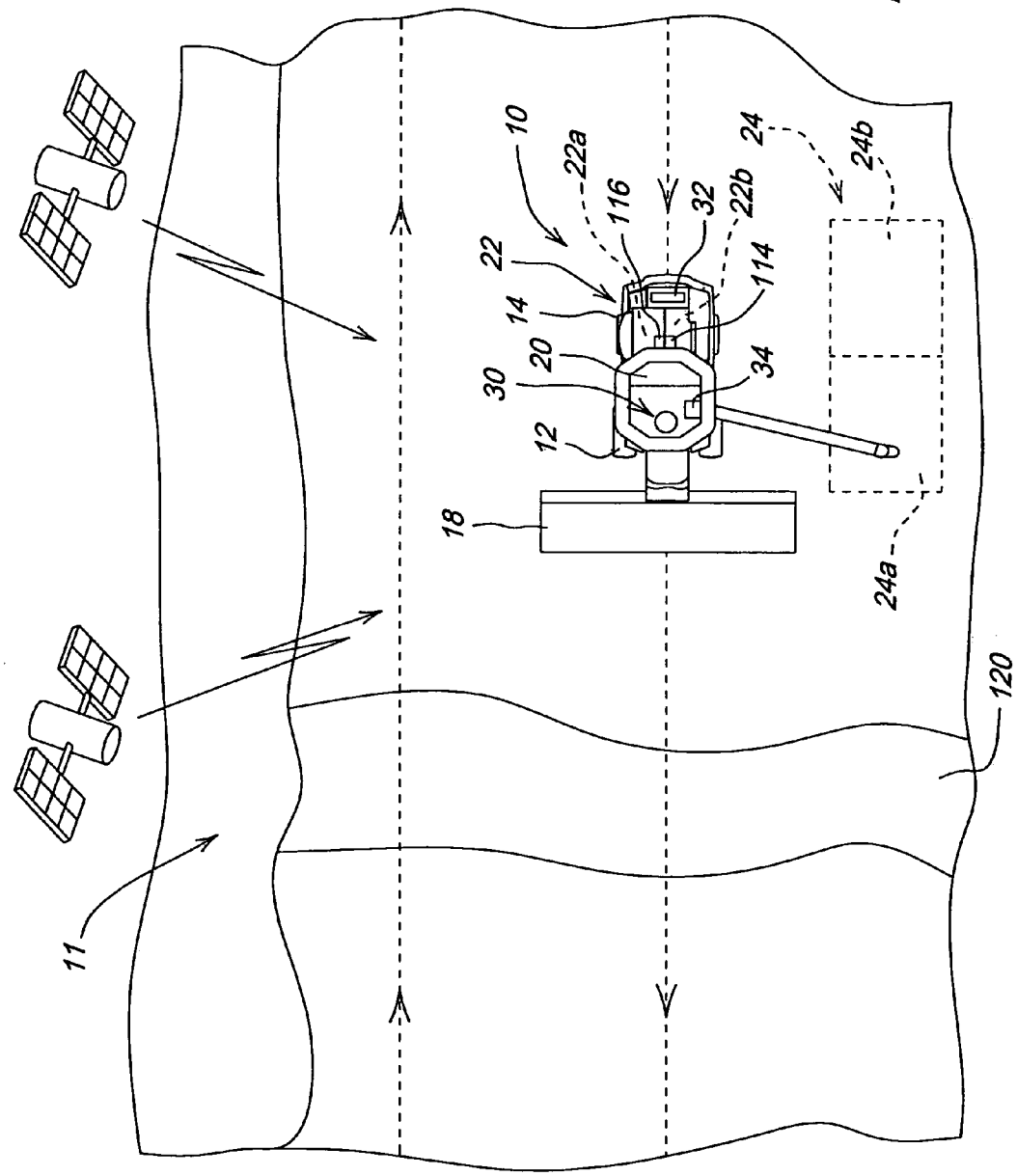
FIG. 1 is a schematic representation of a harvester equipped to harvest crop in a field and segregate that crop according one or more crop attributes.

Referring to FIG. 1, therein is shown a harvester 10 supported for movement over a field 11 by forward drive wheels 12 and rear steerable wheels 14. Forward crop removing structure 18 directs crop to a processing apparatus 20, and the harvested crop is directed to a storage area 22 associated with the harvester, such as one or more bins on the harvester and/or to a crop hauling device or receiver 24 such as a truck or wagon traveling with or positionable alongside the harvester. The harvester 10 includes a conventional GPS system 30 or other conventional locating system for providing harvester location information. The harvester 10 as shown also includes an automatic steering system 32 controlled by a processor 34 located in the harvester cab in response to various inputs including GPS or other locating signals, crop edge signals, area boundaries, desired harvest paths and the like. Alternatively, a map can be displayed in the cab, and the operator can manually steer the harvester 10 with the assistance of the map. The harvester 10 is shown, for illustrative purposes only, as a combine with a header for harvesting grain such as soybeans, corn or wheat, but it is to be understood that the present invention also can be used with many other types of harvesters including but not limited to cotton harvesters, fruit harvesters, cotton and hay balers with one or more baling chambers, and foraging equipment for harvesting crops having attributes that vary.

Figure 2:
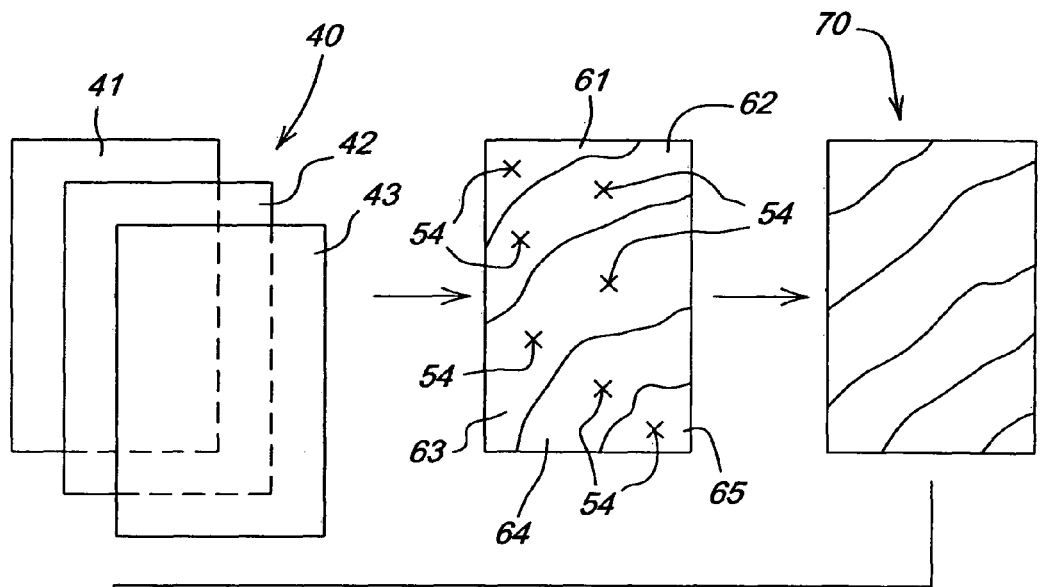
FIG. 2 is schematic illustrative of a process for providing a mission plan from site specific field information.
Figure 2:
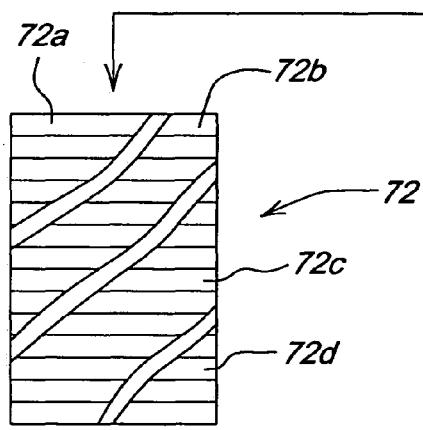
Figure 3:
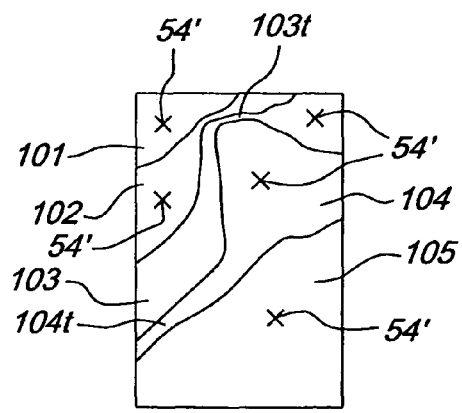
FIG. 3 is a pixel map illustrating transition areas between larger homogenous areas having similar zonal characteristics.

The field to be harvested is divided into zones with similar crop attributes (FIGS. 2 and 3). An attribute map is generated using one or a combination of conventional tools such as remotely sensed multi-spectral or other imaging, elevation map layers, previously accumulated soil and crop information from soil and crop sensors, estimated crop yield, and/or a map layer obtained using a ground vehicle equipped with sensors.

Figure 5:
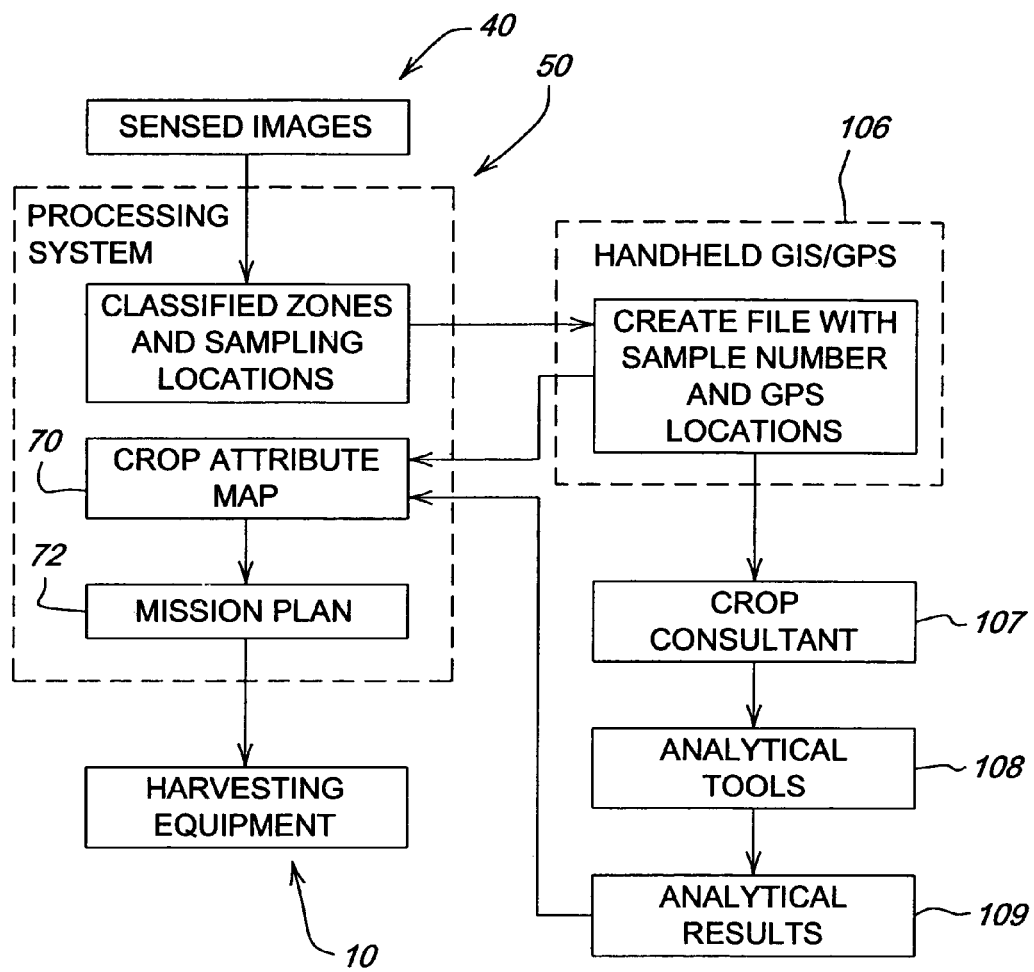
FIG. 5 is a schematic of a system for providing a mission plan for a harvester utilizing site specific information for estimating crop attributes.

As shown by way of example in FIG. 2 and 5, a plurality of layers or sensed images indicated at 40 include layers 41, 42 and 43 are input to a processing system 50 (FIG. 5) to generate a map or locator of directed sampling points 54 within relatively large and generally homogenous areas 61, 62, 63, 64 and 65. Samples from the points 54 are analyzed, and an estimated crop attribute map 70 is generated. The crop attribute map 70 is then used to generate a mission plan 72 for segregating harvested crop according to one or more crop attributes. The crop attribute can be, for example, protein level, starch level, oil level, sugar content, moisture level, digestible nutrient level or any other crop attribute of interest. As shown in FIG. 2, the mission plan includes harvesting separate loads of crop from individual areas 72A, 72B, 72C and 72D. For row crop harvesting, the mission plan guides the harvester 10 parallel to the rows in each area. For non-row crop harvesting, such as wheat harvesting, non-parallel paths can be generated to maximize fuel efficiency, minimize travel distances, and reduce the number of turns at zonal boundaries for optimum productivity.

Figure 4:
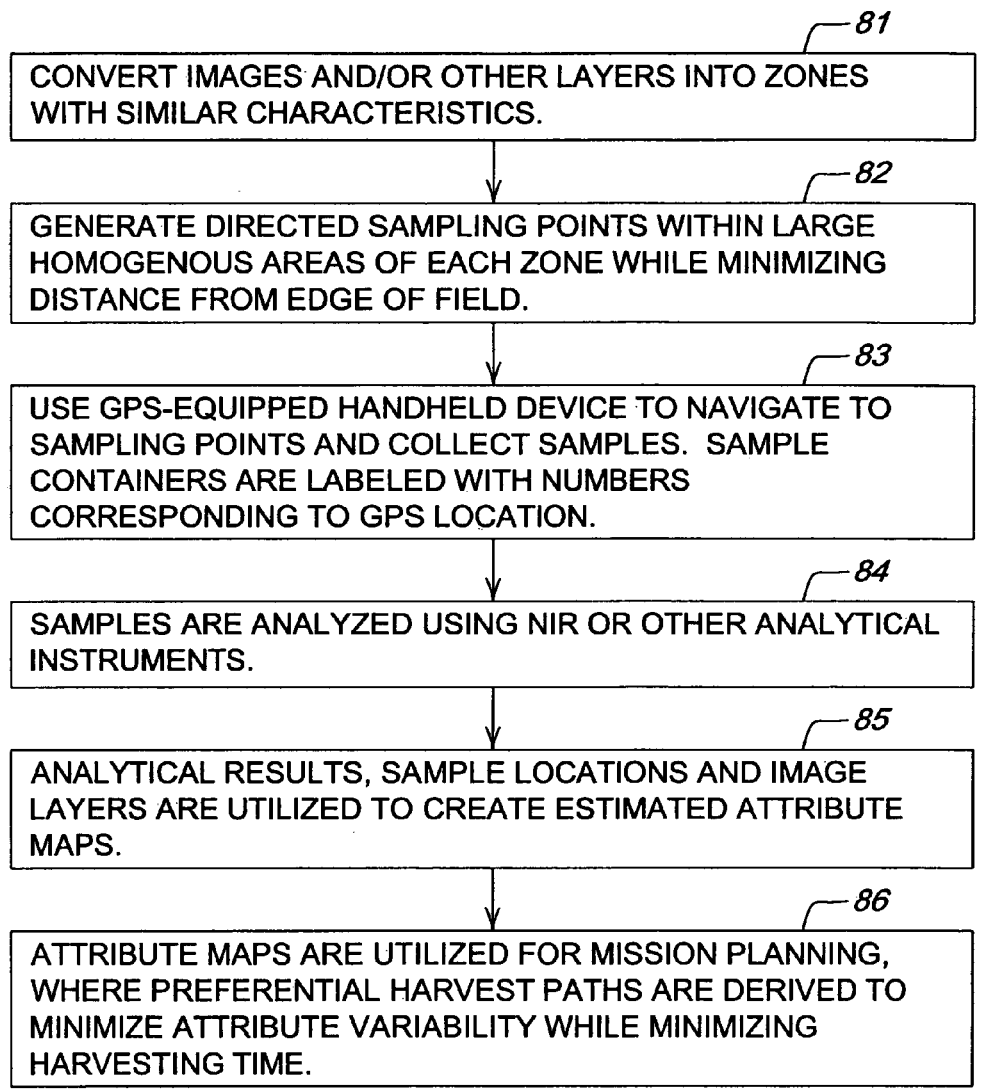
FIG. 4 is a flow chart for a method of controlling a harvester utilizing crop attributes.

In step 81 of FIG. 4 (FIG. 4), a high resolution layer describing a field is obtained. By way of example, the layer 41 can be a remotely sensed multi-spectral image, but other types of remote images could also be used. Alternatively, the layer could be constructed from data obtained with a ground vehicle equipped with sensors. The image of the multi-spectral implementation contains four distinct images, each representing a different band of the same area. The bands include green, red, blue, and near infrared (NIR). Alternatively or additionally, other layer information, such as elevation or electrical conductivity can be utilized. Once the image is obtained, zones that have similar characteristics are identified in each of the layers using an existing software package. The software often uses a clustering algorithm such as k-means to separate the layer 41 into the multiple zones. Alternatively, the individual bands of the image could be transformed into an index such as the commonly utilized Normalized Difference Vegetative Index (NDVI) which can be divided into multiple zones that define the differing crop growth patterns. NDVI is calculated using the formula:

$$NDVI=(NIR-\text{red})/(NIR+\text{red})$$

where NIR is the NIR level from the bands of the image and red is the red level. The values range from $-1$ to $1$, and dividing the index into zones involves dividing the calculated values into ranges. For example, areas between $-1$ and $-0.9$ might be one zone, areas between $-0.9$ to $-0.8$ another zone, and areas between $-0.8$ and $-0.7$ a third zone and so forth.

The zones obtained in step 81 indicate that there is a difference in the attribute of interest across the zones, but do not attach an absolute value to the level of the attribute. During the next step 82 several points 54 are chosen within the identified zones 61-65 indicating where directed crop samples are to be taken. As a further enhancement of this step, the points are identified as close to the edge of the field as possible to avoid excessive travel over the field. A further enhancement is selection of sampling points 54 such that the abruptness of the transition from zone to zone is minimized. Sampling points are selected to minimize abruptness by isolating pixels that are within transition zones determined by calculating a slope of a zone:

$$\text{slope=change in zones/change in distance}$$

and then excluding these pixels from consideration as sampling points. A subsequent step is to identify pixels that are within homogeneous clumps of similar zone classes. At the same time, the distance of sampling locations to the edge of the field is minimized.

In some cases, there will be a two or three zone jump between pixels in the transition zones (FIG. 3). Calculating the slope as described above indicates if there has been a large zone jump in a short distance. A reason for minimizing the abruptness of the transitions is a need to choose zones that are large homogeneous areas and avoid having zones that are only one or two pixels wide. If the zone is very narrow, there is potential for the GPS error to be large enough that the sample gets taken from a neighboring zone rather than the zone of interest. FIG. 3 illustrates an area divided into several zones 101, 102, 103, 104, and 105 including narrow transition areas 103t and 104t. Samples are taken at locations 54' from the broader homogenous areas of the zones, but not from the transition areas 103t and 104t.

In the third step 83 (FIG. 4), the locations of the sampling points and colorized zones are put onto a PDA, laptop, tablet computer, or other portable computer 106 with GPS capability or ability to communicate with a GPS receiver. A consultant 107 uses this information to navigate to the different points such as points 54 shown in FIG. 2 and obtains a crop sample at each point. The consultant 107 initiates the generation of a sample number using the handheld computer. The sample number will be associated with the GPS coordinates of his current location and the sample that was taken at that location.

In step 84, the crop samples taken in the step 83 are analyzed by conventional analytical tools 108 to assign absolute values of the attribute of interest to the samples. Samples can be sent to a lab for analysis and the test result associated with the location from which it was taken. Alternatively, a handheld analysis device or other device operable in the field during the step 83 can provide the necessary data.

Although the estimated mean and variance for a load from each of the areas 72A-72D can be calculated from the distribution of the yield that makes up the load, such an estimation may not be sufficiently accurate to meet marketing needs and end user requirements. In another embodiment, the harvester 10 can include an automatic grain stream sampler 114 at the storage area 22. Grain is selectively channeled into a sampling device and a sample directed to a bar-coded container or other structure 116 for providing an absolute value of crop attribute for the load and/or provide an accurate estimate of the variability of the crop attribute. In addition, similar approaches could be used to obtain a sub-sample of grain entering or leaving the storage area so that grain quality can be estimated for grain hauled in trucks or the like. An NIR device can provide an immediate estimate to assist the operators in decisions about which grain hauling device or compartment 24 should be used based upon anticipated relationships between spectral characteristics and the desired crop attributes. For example, a crop may be segregated according whether the protein level is within a high, medium or low range. Sampling locations during harvest can be selected manually or automatically based upon the points 54 of the map of FIG. 2. The sampling locations can also be based upon reading from an NIR sensor on the harvester 10.

In step 85, analytical results 109 obtained in step 84 and the locations from which the corresponding samples were taken are input to the processing system on which the information layers for the field are already stored. This data is used to make an estimated attribute map 70 in step 85. Measured values of the attribute are associated to the underlying pixel values in each of the layers. The resultant array is evaluated using a statistical procedure such as multiple linear regression. The resultant regression equation is then applied to the original image layer or layers to estimate the attribute value for all pixels, resulting in an estimated attribute map with the same resolution as the original data layer or layers.

During step 86 the attribute map developed in the step 85 is used to develop a mission plan that indicates how to subdivide the field into areas that are relatively homogeneous with respect to the attribute of interest. How the mission plan is developed depends on crop and how the harvester travels through the crop. If the crop is wheat, nearly any path can be followed. If the crop is a row crop such as corn, the harvester must travel in a direction parallel to the direction of the rows to avoid loss of grain. The mission plan can be input into the automatic steering system 32 and the vehicle will maneuver itself to the different areas of the field. Alternatively, the mission plan can be implemented by displaying the attribute map in the cab of the harvester and allowing the operator to make decisions about how to navigate.

Mission planning as described above can also be used where the harvested crop is immediately discharged from the harvester. Examples include hay bales, cotton bales or containerized systems, and the harvester 10 is steered according to the mission plan to minimize variability within each bale or container. Such mission planning for bales and containers is especially useful where the bales or containers contain crop from a relatively large acreage. An RFID or other labeling system can provide harvested position and crop attribute information for the bale or container, but the further use of the mission plan reduces the variability of the crop attribute for each bale or container.

In another embodiment, crop can be directed to one of two or more storage compartments associated with the harvester, with the storage area selected dependent on the estimated crop attribute level. By way of example, the storage compartments can be two or more bins or chambers 22a and 22b at the storage area 22 or two or more receptacles or areas 24a and 24b of the crop hauling device 24. By using diverting in combination with a mission plan, the crop can be divided by attribute with less variation into a number of batches or loads with the number not limited by the number of storage areas at the harvester.

If there is a relatively narrow zone of crop with a differing attribute, such as shown at 120 in FIG. 1, the diverter can direct the harvested crop from that area into one of the bins 22a and 22b to maintain the desired attribute level of the batch in the other bin. Such diverting results in fewer path interruptions in the mission plan for the harvester 10 without increasing variations in crop attributes within a batch of harvested crop.

Having described the preferred embodiment, it will become apparent that various modifications can be made without departing from the scope of the invention as defined in the accompanying claims.

The invention claimed is:

1. A method for controlling a harvester for harvesting a crop in a field, the method comprising:
   a) providing site specific information comprising ground elevation information of the field and a multi-spectral image of the field, the site specific information related to one or more attributes of the crop;
   b) inputting the site specific information to a processor;
   c) providing an attribute map of an estimated crop attribute level for the at least one crop attribute utilizing the site specific information and a plurality of samples taken at a plurality of sampling points, the providing of the attribute map comprising:
   determining a plurality of zones of the crop attributes;
   generating the sampling points within a homogenous area of each zone;
   excluding sample points in one or more transition areas between different zones of crop attribute levels, where the transition areas are defined by a slope, the slope determined based on a ratio between a change in a number of the zones and the distance between the zones,
   and analyzing the samples from the sampling points; and
   d) during harvesting, controlling the harvester utilizing the attribute map to steer the harvester and segregate harvested crop according to the estimated crop attribute level based on the elevation information of the field and the multi-spectral image of the field.

2. The method as set forth in claim 1 further comprising the step of providing a preferred steering path based on the attribute map, and the step of controlling the harvester includes steering the harvester according to the preferred steering path.

3. The method as set forth in claim 1 wherein the site specific information further includes one or more of the following: previous crop yield; estimated crop yield; and environmental conditions.

4. The method as set forth in claim 1 wherein the step of controlling the harvester includes directing the harvested crop to a selected storage area, wherein the storage area selected is dependent on the estimated crop attribute level.

5. The method as set forth in claim 1 further comprising the step of determining a preferred harvesting path to minimize attribute variability during harvesting.

6. The method as set forth in claim 5 wherein the step of determining a preferred harvesting path includes minimizing harvest time while maintaining the minimized attribute variability.

7. A method for determining a path of a steerable harvester for harvesting a crop in a field, the method comprising:
   a) providing site specific information related to one or more attributes of the crop, the site specific information comprising ground elevation information of the field and a multi-spectral image of the field;
   b) inputting the site specific information to a processor;
   c) providing an attribute map of an estimated crop attribute level for the at least one crop attribute utilizing the site specific information and a plurality of samples taken at a plurality of sampling points, the providing of the attribute map comprising:
      determining a plurality of zones of the crop attributes;
      generating the sampling points within a homogenous area of each zone;
      excluding sample points in one or more transition areas between different zones of crop attribute levels, where the transition areas are defined by a slope, the slope determined based on a ratio between a change in a number of the zones and the distance between the zones,
      and analyzing the samples from the sampling points; and
   d) during harvesting of the crop, steering the harvester utilizing the attribute map to segregate harvested crop according to the estimated crop attribute level based on the elevation information of the field and the multi-spectral mage of the field.

8. The method set forth in claim 7 wherein the step of providing the attribute map comprises providing a remote image of the field and converting the images into zones of similar characteristics.

9. The method as set forth in claim 7 including the step of assigning GPS location information to the sampling points.

10. The method as set forth in claim 7 including the step of providing a preferred harvest path utilizing the attribute map, and wherein the step of steering the harvester includes steering the harvester along the preferred path.

11. The method as set forth in claim 10 wherein the step of steering includes automatically steering the harvester based on the preferred path.

12. The method as set forth in claim 10 wherein the step of providing the preferred path includes providing a path that minimizes both crop attribute variability of the harvested crop and harvest time for harvesting the crop.

13. The method as set forth in claim 7 wherein the site specific information further includes one or more of the following: previous crop yield; estimated crop yield; and environmental conditions.

14. The method as set forth in claim 7 wherein the attributes of the crop include one or more of the following: protein level, starch level, oil level, sugar content, moisture level, digestible nutrient level.

15. The method as set forth in claim 7 wherein the steerable harvester comprises one of the following: a combine; a cotton picker; a hay baler; a grape harvester; and forage harvesting equipment.

16. A method for segregating harvested product for a harvester, the method comprising:
   a) providing site specific information related to one or more attributes of the crop, the site specific information comprising ground elevation information of the field and a multi-spectral image of the field;
   b) providing an attribute map of an estimated crop attribute level for the at least one crop attribute utilizing the site specific information and a plurality of samples taken at a plurality of sampling points, the providing of the attribute map comprising:
      determining a plurality of zones of the crop attributes;
      generating the sampling points within a homogenous area of each zone;
      excluding sample points in one or more transition areas between different zones of crop attribute levels, where the transition areas are defined by a slope, the slope determined based on a ratio between a change in a number of the zones and the distance between the zones,
      and analyzing the samples from the sampling points; and
   c) during harvesting of the crop, controlling the harvester utilizing the attribute map to segregate the crop being harvested according to the estimated crop attribute level, the step of controlling including steering the harvester in dependence on the attributes of the crop based on the elevation of the field and the multi-spectral image of the field.

17. The method as set forth in claim 16 wherein the step of controlling the harvester further includes directing harvested product to a selected storage area, wherein the storage area selected is dependent on the estimated crop attribute level.

18. The method as set forth in claim 17 wherein the step of directing harvested product to a selected storage area includes directing product to one or more of the following: one of a plurality of storage locations on the harvester; a transport truck used to haul crop from a field; one of two or more baling chambers; produce containers on the harvester; produce containers adjacent the harvester; and a crop discharge hauling device receiving crop immediately discharged from the harvester as the harvester moves through the field.

19. The method as set forth in claim 16 wherein the step of controlling the harvester comprises steering the harvester utilizing the attribute map to minimize crop attribute variations of harvested crop.

20. The method as set forth in claim 19 wherein the step of steering comprises determining a preferred harvester path utilizing the attribute map and automatically steering the harvester over the preferred path.

21. A method for segregating harvested product for a harvester, the method comprising:
   a) providing site specific information related to crop attributes of a crop, the site specific information comprising ground elevation information of the field and a multi-spectral image of the field;
   b) determining a plurality of zones of the crop attributes from the site specific information;
   c) generating a plurality of sampling points within a generally homogenous area of each zone,
   d) taking a plurality of attribute samples at a plurality of identified sampling locations that exclude sampling locations in transition areas between different zones of crop attribute levels, where the transition areas are defined by a slope, the slope determined based on a ratio between a change in number of zones and the distance between the zones;
   e) providing an attribute map of an estimated crop attribute level for the at least one crop attribute level utilizing the site specific information and attribute samples; the attribute map comprising the determined zones of the crop attributes, and analyzing the samples from the sampling points; and f) controlling the harvester utilizing the attribute map to segregate harvested crop according to the estimated crop attribute level based on the elevation information of the field and the multi-spectral image of the field.

22. The method as set forth in claim 21 wherein the step of determining transition areas comprises isolating pixels within a transition area and excluding the pixels from sampling points for the crop.

23. The method as set forth in claim 22 wherein the step of isolating pixels comprises determining rate of change of the zones over distance.

24. The method as set forth in claim 21 including the step of identifying pixels within homogenous clumps of similar zones.

25. The method as set forth in claim 21 including the step of determining the mean and/or variance for the attributes of the segregated harvested crop.

26. The method as set forth in claim 21 including the step of determining the mean and/or variance for the attributes of the segregated harvested crop comprises utilizing a sampler located at the harvester.

* * * * *